H. KLECKLER.
AEROPLANE WING HINGE.
APPLICATION FILED APR. 16, 1917.

1,306,764.

Patented June 17, 1919.
2 SHEETS—SHEET 1.

Inventor
HENRY KLECKLER.

By John P. Larboy
Attorney

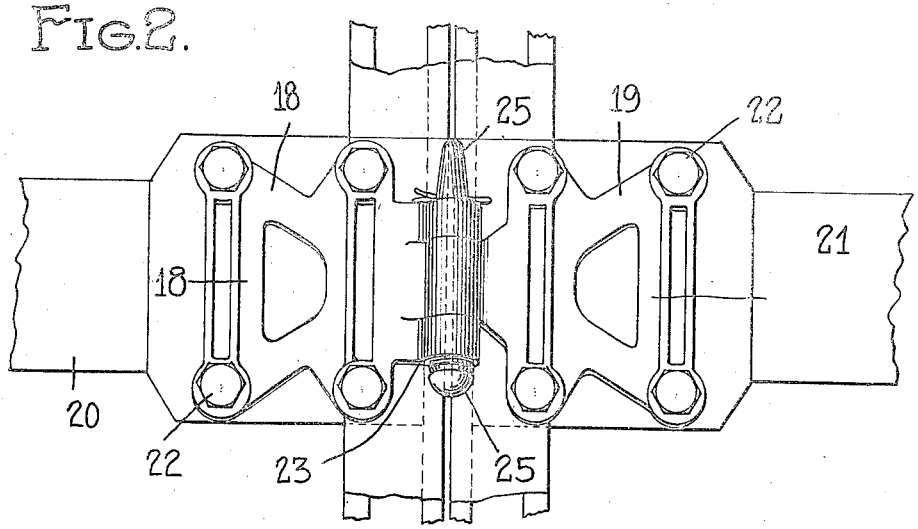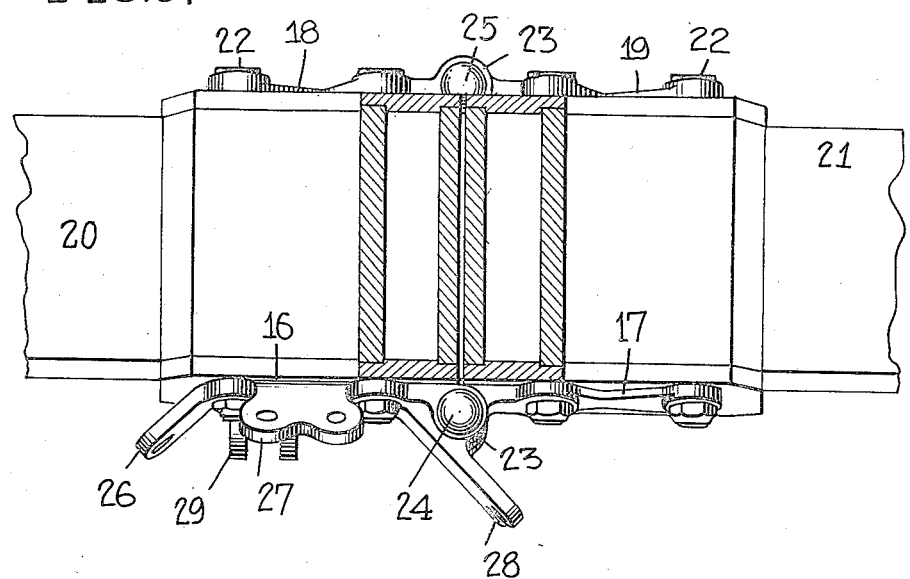

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

AEROPLANE-WING HINGE.

1,306,764.  Specification of Letters Patent.  Patented June 17, 1919.

Application filed April 16, 1917. Serial No. 162,532.

*To all whom it may concern:*

Be it known that I, HENRY KLECKLER, a citizen of the United States, residing at Buffalo, in the county of Erie and State of New York, have invented certain new and useful Improvements in Aeroplane-Wing Hinges, of which the following is a specification.

My invention relates to aeroplane fittings and more particularly to improvements in wing hinges.

The characteristic of the invention, broadly, is the overlapping arrangement of the wing structure wiring (overlapping as regards the connected wing panels) whereby a tightening thereof tends to draw the connected panels more firmly into abutting or engaging relation. In gaining this end it is proposed to equip the wing hinges with ears or similar devices for the proper anchorage of the wiring; the ears, for obvious reasons, being formed on the far or offside of the hinge joint. Heretofore the anchorages for the wiring have been formed upon wing post sockets, separate fittings, or possibly upon hinges, (where connected panels are used) but never, in so far as I am aware, upon the offside of the hinge joint and in the form of angularly extending integral ears. Moreover, the improved wiring or trussing arrangement herein disclosed affords a connection between panels auxiliary to the hinge pin connection ordinarily used.

Of the drawings, wherein like characters of reference designate like or corresponding parts:

Fig. 2 is a top plan view of the hinge joint or wing hinge, and

Fig. 3 is a side elevation of the wing hinge with the wing partly in section.

Figure 1:
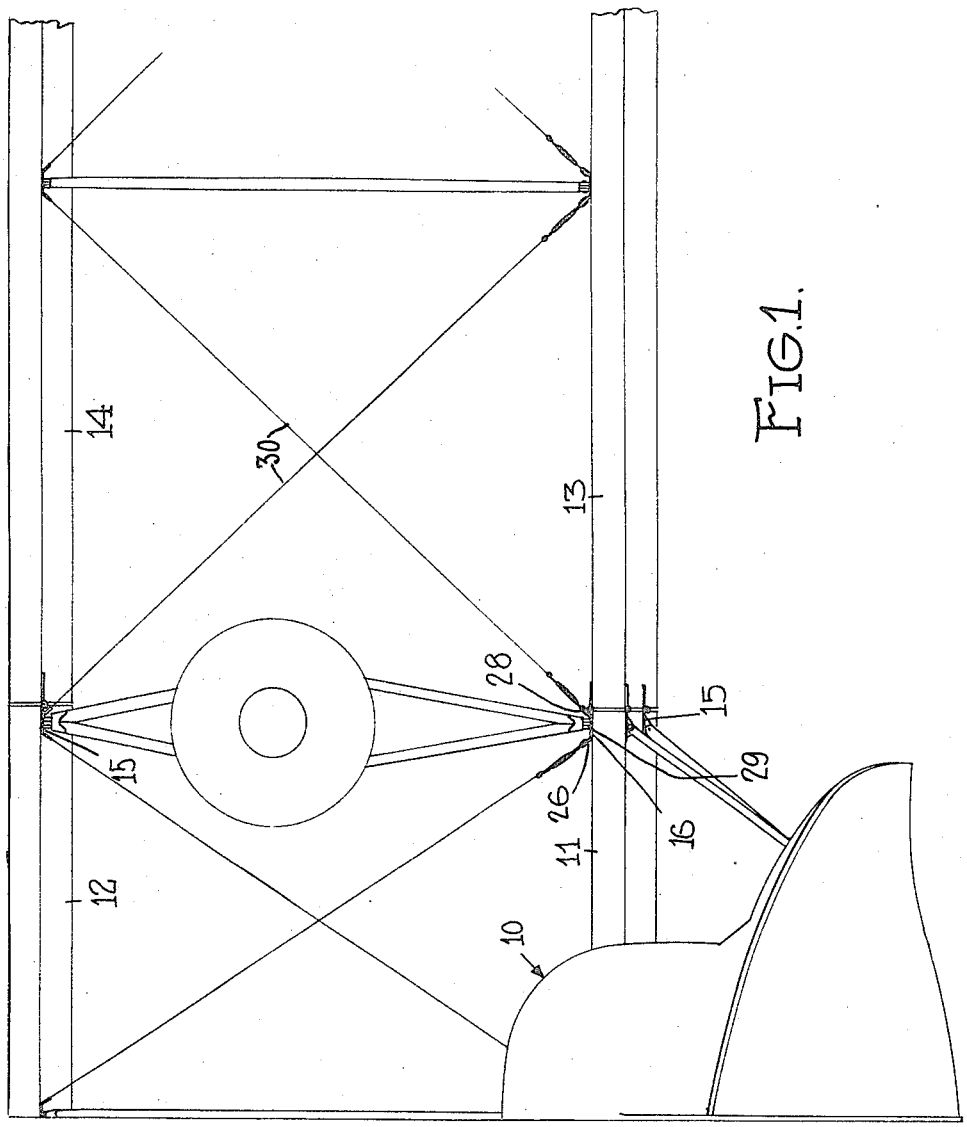
Figure 1 is a front elevation of a portion of the wing structure of a flying boat illustrating the improved wiring or trussing of the invention herein disclosed.

The adaptation of the improved wiring or trussing is shown in connection with a flying boat only by way of illustration. It may be used in connection with any and all aeroplane structures regardless of type. Also, the number of wings and the number of panels may be varied.

The hull of the craft I have designated as an entirety by the numeral 10. It is equipped with stub wings 11 (but one being shown). These wings 11 together constitute the engine section panel or central panel of the lower wing. The engine section panel or center panel of the upper wing is designated 12. Intermediate or outer panels 13 and 14 are respectively connected to the panels 11 and 12.

The connection between the panels 11 and 13 and the panels 12 and 14 of the superposed wings is best illustrated in Figs. 2 and 3 wherein the wing hinge *per se* (designated in its entirety by the numeral 15) is shown. The hinge comprises connected hinge sections or plates 16 and 17 on the one hand and connected hinge plates or sections 18 and 19 on the other, the plates or sections, in pairs, being disposed or fastened against opposite faces of the wing and conjointly fastened to the wing beams 20 and 21 of the respective panels by through bolts 22 passing entirely through the beams 20 and 21. Said plates in each instance are equipped with complemental alined sockets 23. The sockets of the hinge sections 16 and 17 together provide a barrel for the hinge pin 24 of that portion of the complete hinge formed by the section or plates 16 and 17 and the sockets of the plates or sections 18 and 19, a barrel for the hinge pin 25 for the sections or portions of the complete hinge formed by the plates 18 and 19. In this connection it will be noted that the hinge in its entirety is composed of at least four sections, simultaneously fastened, and so arranged with respect to the beams 20 and 21 that the sections, in pairs, will engage with the opposite faces thereof. The hinge pins 24 and 25 may be cotter-pinned or otherwise appropriately fastened in place.

Ears 26, 27, 28 and 29 are formed upon each wing hinge 15. For reasons pointed out, the ears are all formed upon one of the hinge plates or sections of the hinge. In the hinges of the upper wing the several ears are formed upon the lower inner hinge section and in the hinges of the lower wing upon the upper inner hinge sections. In a triplane or multiplane the wing hinges of the intermediate planes are equipped with hinges having ears formed upon both the upper and lower inner hinge sections. This location of the ears is such that the wing structure wiring, collectively designated 30, will overlap as regards the connected wing panels to supplement the panel connections afforded by the hinge pins 24 and 25. Principally, however, this arrangement of the wing structure wiring is such that a tightening thereof tends to draw the connected panels more firmly into abutting or engaging relation.

All of the ears, except the duplicate ears 29, serve as anchorages for the wiring 30. Said ears 29 provide sockets for either wing posts or wing post frames. The ears 26, 27 and 28 are angularly extended, the angularity being determined by the angularity of the particular stay or wire anchored thereto. Where double wiring is used the ears may be equipped with twin anchorages as shown. Furthermore, compactness is enhanced by the formation of one of the socket members through a widening of the ear 28.

Under all circumstances it is proposed that the wires 30 shall overlap the connected panels and that the ears 28 to which the wires 30 are anchored shall be formed integrally upon the off or far side of the hinge (see Fig. 1). It is also believed to be novel to combine in a single organization a socket, anchorages, and a hinge. Where a plural number of connected panels are used, the idea of overlapping the wiring at each wing joint is to be carried out.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. An airplane wing truss including wing panels arranged to provide separable wing cells together with wiring cross arranged between the panels of one cell, the wiring at one end extending beyond the particular cell which it cross braces for connection with an adjacent cell to firmly tie the adjacent cells together.

2. In an airplane wing truss, superposed wings comprising separable wing panels, wing hinge connections between adjacent panels, anchorages for brace wires provided at one side of the dividing line between adjacent panels, and brace wires inter-tying the superposed wings, the wires at their inner ends being fastened to the anchorages and at their outer ends being fastened to the wings at points upon the opposite side of the dividing line from that upon which the anchorages are located whereby the wires in addition to their function as brace wires between the superposed wings, function also as a means for tying adjacent wing panels together.

3. In an airplane wing truss, superposed wings comprising separable wing panels, wing hinge connections between adjacent panels, ears formed upon the hinge connections at one side of the dividing line between adjacent panels, and brace wires crossed between the superposed wings, the wires at their inner ends being fastened to the hinge ears and at their outer ends to the wings at points upon the opposite side of the dividing line from that upon which the hinge ears are located whereby the wires in addition to their function as brace wires between the superposed wings, function also as a means for tying adjacent panels together.

In testimony whereof I hereunto affix my signature.

HENRY KLECKLER.